United States Patent [19]

Mueller et al.

[11] Patent Number: 5,194,556
[45] Date of Patent: Mar. 16, 1993

[54] RIGID CONTACT LENSES WITH IMPROVED OXYGEN PERMEABILITY

[75] Inventors: Karl F. Mueller, New York, N.Y.; Bernhard Seiferling, Goldbach, Fed. Rep. of Germany; Michael C. Bochnik, Yonkers, N.Y.

[73] Assignee: Ciba-Geigy Corporation, Ardsley, N.Y.

[21] Appl. No.: 638,949

[22] Filed: Jan. 9, 1991

[51] Int. Cl.$^5$ ............................................. C08G 77/04
[52] U.S. Cl. ....................................... 528/28; 528/26
[58] Field of Search ...................................... 528/28, 26

[56] References Cited

U.S. PATENT DOCUMENTS

| | | |
|---|---|---|
| 3,808,178 | 4/1974 | Gaylord . |
| 4,130,708 | 12/1978 | Friedlander et al. ................. 528/28 |
| 4,136,250 | 1/1979 | Mueller et al. . |
| 4,189,546 | 2/1980 | Deichert et al. . |
| 4,208,362 | 6/1980 | Deichert et al. . |
| 4,275,184 | 6/1981 | Bargain et al. ......................... 528/28 |
| 4,276,402 | 6/1981 | Chromecek et al. . |
| 4,387,206 | 6/1983 | Bayer et al. ............................ 528/28 |
| 4,486,577 | 12/1984 | Mueller et al. ........................ 528/28 |
| 4,605,712 | 8/1986 | Mueller et al. . |
| 4,734,475 | 3/1988 | Goldenberg et al. . |
| 4,740,533 | 4/1988 | Su et al. ................................. 528/28 |
| 4,837,289 | 6/1989 | Mueller et al. . |
| 4,923,906 | 5/1990 | Mueller et al. . |

FOREIGN PATENT DOCUMENTS

| | | |
|---|---|---|
| 0109355 | 5/1984 | European Pat. Off. . |
| 0288567A1 | 11/1988 | European Pat. Off. . |
| 0424099A2 | 4/1991 | European Pat. Off. . |
| 0455585 | 11/1991 | European Pat. Off. . |
| 0455587 | 11/1991 | European Pat. Off. . |

OTHER PUBLICATIONS

Chem. Abst. 100, 211286u.
Derwent Abst. of U.S. Pat. No. 2,718,516.
Derwent Abst. 70-84518R/45.

Primary Examiner—Joseph L. Schofer
Assistant Examiner—N. Sarofim
Attorney, Agent, or Firm—Luther A. R. Hall; William G. Hervey

[57] ABSTRACT

Hard polymers with extremely high oxygen permeability are described, which consist of the copolymerization product of 1-15% by weight of a poly(dimethylsiloxane) bearing multiple polymerizable vinyl groups and having a number-average molecular weight $M_n$ of 1000-7000, 20-50% of an oligosiloxanylalkyl (meth)acrylate, 25-50% of an at least three fluorine atoms containing vinyl-monomer, 0-30% of copolymerizable monomers, which by themselves as homo- or copolymers have a Shore-D hardness of at least 85, 1-25% of polyvinyl-crosslinking monomer of 200-1000 molecular weight, and 0-15% of a watersoluble, copolymerizable monomer. The novel polymers combine a Shore-D hardness of 70-85 with an oxygen permeability of 40-90 barrers, making them outstanding materials for the manufacture and use as rigid, gas-permeable contact lenses.

3 Claims, No Drawings

RIGID CONTACT LENSES WITH IMPROVED OXYGEN PERMEABILITY

BACKGROUND OF THE INVENTION

Rigid contact lenses are an important segment of the contact lens market because they alone can be manufactured with the precision required to correct the more severe vision defects, like astigmatism.

Originally, hard lenses were made from poly(methyl methacrylate) and had no oxygen permeability; Rigid-Gaspermeable Contact Lenses, RGP's, were first developed in the early 1970's to provide the possibility of extended wear and greater comfort and are described in U.S. Pat. No. 3,808,178; they are copolymers of oligosiloxanyl-alkyl methacrylates with oxygen permeabilities of 10 to 25 barrers; subsequently RGP polymers were described, for example in U.S. Pat. Nos. 4,486,577; 4,605,712; 4,734,475 and 4,923,906, which are based not on oligosiloxane-mono-methacrylates, but on polymeric dimethylsiloxane-di- and poly-methacrylates and which are characterized by greater toughness and oxygen permeabilities DK of up to 35 barrers.

While these levels of DK are high enough to ensure an oxygen flux to the cornea, which will reduce the incidence and severity of oxygen deficiency, for truly extended-wear use and over-night use of an RGP, permeabilities much higher are required in order to reduce corneal swelling to a minimum. This has more recently been accomplished by including fluorinated comonomers into the polymer, in addition to the silicone containing components; such compositions have been described in JP 82-130836, in which trifluoroethyl methacrylate is added to an oligosiloxanyl-alkyl methacrylate type RGP formulation, and in U.S. Pat. No. 4,486,577, where hexafluoroisopropyl methacrylate is combined with the poly(dimethylsiloxane)-macromer type RGP formulation.

With such combination polymers $O_2DK$ values of up to 60 have been achieved. Attempts however to further increase the permeability by increasing the proportion of silicone and fluorine containing monomers conflict with the need to keep other physical properties, like hardness and dimensional stability and toughness at a useful level. If, for example, in using the oligosiloxanyl-monomer approach the amount of fluorinated monomers is increased over 30%, an increasingly brittle polymer is obtained, which despite its high $O_2$-permeability cannot be machined or handled as a contact lens without breaking it. On the other hand, if in using the polysiloxy macromer approach either the fluorinated monomer or the siloxane-macromer is increased above a certain percentage, phase separation can led to unacceptable haziness and the polymers hardness is reduced to a level where machining and polishing the polymer and lens become impossible and dimensional stability is sacrificed.

It has now unexpectedly been discovered, that if in a fluorine and silicone containing RGP formulation 1–15% of a poly(dimethylsiloxane) macromer is incorporated, the resulting polymers possess a combination of toughness, hardness and oxygen permeability which is far superior to what can be attained otherwise.

Similiar polymers are described in U.S. Patent Nos. 4,486,577; 4,605,712; 4,734,405 and 4,923,906, but in all cases do these polymers contain at least 15% by weight of the poly(siloxane)-macromer, typically more than 25%, and the polymers have therefore a poorer combination of properties, than the polymers of the instant invention. No hard contact lens materials have been described which combine units of an oligosiloxane methacrylate, a fluorinated methacrylate and a poly(siloxane)-macromer, and which possess as high an oxygen permeability and hardness as the polymers of the instant invention.

DETAILED DESCRIPTION

The rigid and tough, highly oxygen permeable polymers of this invention are the copolymerization product of:

(A) 1–15% by weight of a linear or branched poly(dimethylsiloxane) macromer having a number average molecular weight $M_n$ of about 1000 to 8000, said macromer containing at least two terminal or pendent polymerizable olefinic groups attached to the poly(siloxane) chain through an Si-C bond, (B) 10–50% by weight of an oligosiloxanyl-alkyl acrylate or methacrylate with from 2–10 Si atoms, (C) 10–50% by weight of a fluorine substituted alkyl acrylate or methacrylate with from 3–21 F-atoms in the alkyl group, (D) 0–30% by weight of a copolymerizable vinyl monomer whose homopolymer has a Shore D hardness of at least 85, (E) 1–25% by weight of a di- or polyvinyl crosslinking monomer of 200 to 1000 molecular weight, and (F) 0–15% of a water-soluble, copolymerizable vinyl monomer.

Preferred polymers are the copolymerization product of:

(A) 3–15%, (B) 25–45%, (C) 20–45%, (D) 0–15%, (E) 1–20% and (F) 3–15%, all by weight, and wherein (A) is the reaction product of a poly(dimethylsiloxane)-polyol, polythiol, polyamine, polyacid or polyoxirane of structure:

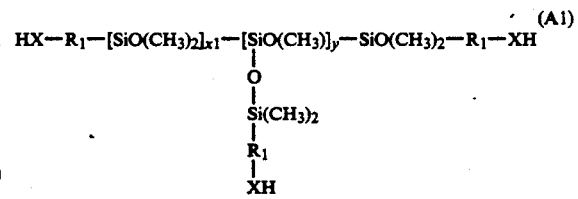

wherein X is oxygen, sulfur, —NH— or —COO—,
$R_1$ is a linear or branched alkylene group with 2–7 carbon atoms,
x1 is an integer from 10–100 and
y is 0 to 4;
poly(dimethylsiloxane)-tetrol of structure:

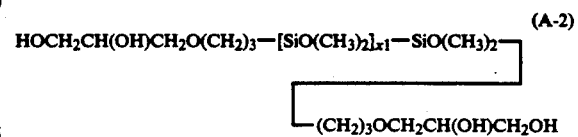

wherein x1 is defined as above;
poly(dimethylsiloxane)-polyamine of structure:

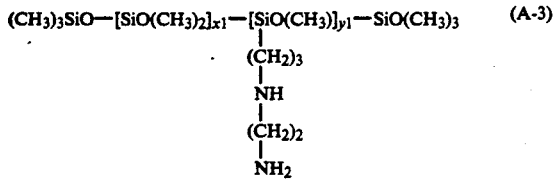

wherein y1 is 1-5;

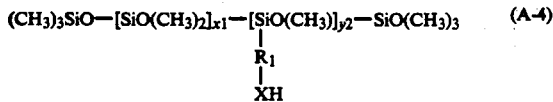

wherein y2 is 2-6 and X is as described above;

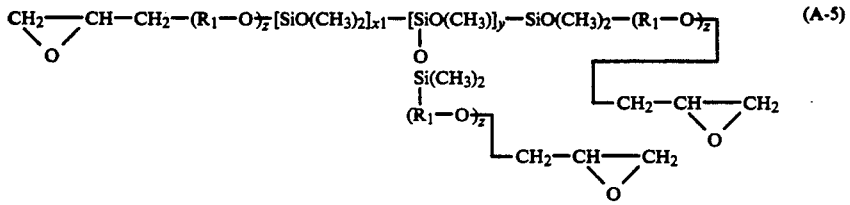

or

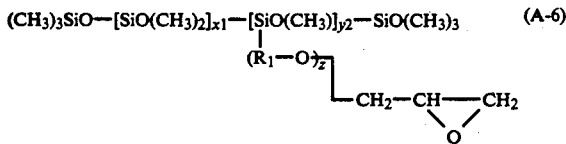

wherein $R_1$ is as described above and z is zero or 1, with a vinyl-unsaturated reactive monomer derived from the group of consisting of the acrylates, methacrylates, acrylamides, methacrylamides, maleates, itaconates, vinyl ethers, styrene or allyl containing compounds.

The term vinyl-unsaturated reactive monomer means in the context of this invention a vinyl monomer of the group described above which contains a reactive group capable of reacting with the reactive group of the chosen poly(siloxane), and can be a hydroxy, amino, carboxy, oxirane, thiol, anhydride or isocyanate group.

More preferred are polymers, wherein (A) is a linear or branched poly-(dimethylsiloxane) macromer with a number average molecular weight $M_n$ of about 1000 to 5000 and terminal or pendent polymerizable olefinic groups obtained by reaction of poly(-dimethylsiloxanes) of structures (A-1), (A-2), (A-3), (A-4), (A-5) and (A-6) with a vinyl-unsaturated reactive monomer derived from the group consisting of the acrylates, methacrylates, styrene or allyl containing compounds, (B) is 3-methacryloxy-tris-(trimethylsiloxy)-silyl propane (C) is hexafluoroisopropyl methacrylate or trifluoroethyl methacrylate, (D) is methyl methacrylate, cyclohexyl methacrylate, trimethylcyclohexyl methacrylate or isobornyl methacrylate, (E) is a di-or triacrylate or methacrylate of 200–1000 molecular weight, divinylbenzene, 3,5-bis(3-methacroyloxypropyl)-3,5-bis(trimethylsiloxy)-1,1,1,7,7,7-hexamethyltetrasiloxane, 1,3-bis(3-methacroyloxypropyl)-1,1,3,3,-tetramethyldisiloxane, or the reaction product of equivalent amounts of an hydroxy or amino functional vinyl compound with a diisocyanate or with a isocyanato substituted vinyl compound, and (F) is acrylic or methacrylic acid, N,N-dimethylacrylamide, 2-hydroxyethyl acrylate or methacrylate, maleic or itaconic anhydride or N-vinylpyrrolidone.

Also preferred are polymers, wherein (A) is the reaction product of a poly(dimethylsiloxane)-polyol or polyamine of structure (A-1), (A-2), (A-3) and (A-4) with an oxirane or isocyanato substituted vinyl monomer derived from the group consisting of the acrylates, methacrylates, styrene or allyl containing compounds; polymers, wherein (A) is the reaction product of a poly(dimethylsiloxane)-polyoxirane of structure (A-5) or (A-6) with an carboxy, amino, mercapto or hydroxy substituted vinyl monomer derived from the group consisting of the acrylates, methacrylates, styrene or allyl containing compounds; polymers, wherein (A) is the reaction product of a poly(dimethylsiloxane)-polythiol of structure (A-1) or (A-4) with glycidyl methacrylate or an isocyanato substituted vinyl monomer and polymers, wherein (A) is the reaction product of a poly(dimethylsiloxane)-polyacid of structure (A-1) or (A-4) with glycidyl methacrylate or an hydroxy or amino substituted vinyl monomer.

Most preferred are polymers, wherein (A) is the reaction product of a poly(dimethylsiloxane)-polyol of structures (A-1), (A-2) or (A-4) with an isocyanato substituted vinyl monomer or with the reaction product of equimolar amounts of a hydroxy or aminofunctional vinyl compound with an aliphatic or cycloaliphatic diisocyanate, and (E) is a di-or triacrylate or methacrylate of 200–1000 molecular weight, divinylbenzene, or is the reaction product of equivalent amounts of a hydroxy or aminofunctional vinyl compound with an aliphatic or cycloaliphatic diisocyanate or with a isocyanato substituted vinyl compound.

Also most preferred are polymers, wherein (A) is the reaction product of a poly(dimethylsiloxane)-polyol or polyamine of structure (A-1), (A-2) or (A-4) and the isocyanato substituted vinyl monomer is 2-isocyanatoethyl methacrylate or m-isopropenyl-α,α-dimethylbenzyl isocyanate, or is the reaction product of equimolar amounts of 2-hydroxyethyl methacrylate, N-t-butyl-2-aminoethyl methacrylate or allyl alcohol with isophorone diisocyanate or 3,3,4(4,4,3)trimethylhexane-1,6-diisocyanate, and (E) is a dior triacrylate or methacrylate of 200–1000 molecular weight, divinylbenzene, or is the reaction product of equimolar amounts of 2-hydroxyethyl methacrylate, N-t-butyl-3-aminopropyl methacrylate or allyl alcohol and isophorone diisocyanate or 3,3,4(4,4,3)trimethylhexane-1,6-diisocyanate, or with 2-isocyanatoethyl methacrylate or m-isopropenyl-α,α-dimethylbenzyl isocyanate.

Especially preferred are polymers, wherein (A) is the reaction product of a poly(dimethylsiloxane)-diol or diamine of structure (A-1) wherein X is oxygen or —NH—, y is zero, x is 20-50, and the isocyanato substituted vinyl compound is 2-isocyanatoethyl methacrylate or m-isopropenyl-α,α-dimethylbenzyl isocyanate, or the reaction product of equimolar amounts of 2-hydroxyethyl methacrylate, N-t-butyl-2-aminoethyl methacrylate or allyl alcohol with isophorone diisocyanate or 3,3,4(4,4,3)trimethylhexane-1,6-diisocyanate, and in which (B) is tris-(trimethylsiloxy)-silylpropyl methacrylate,
(C) is hexafluoroisopropyl methacrylate,
(D) is trimethylcyclohexyl methacrylate,
(E) is a di-or triacrylate or methacrylate of 200-1000 molecular weight, divinylbenzene, or is the reaction product of equimolar amounts of 2-hydroxyethyl methacrylate, N-t-butyl-2-aminoethyl methacrylate or allylalcohol and isophorone diisocyanate or 3,3,4(4,4,3)trimethylhexane-1,6-diisocyanate, or with 2-isocyanatoethyl methacrylate or m-isopropenyl-α,α-dimethylbenzyl isocyanate, and
(F) is methacrylic acid.

Other useful polymers are those, wherein (A) is the reaction product of a poly(dimethylsiloxane)-tetrol of structure (A-2) with an isocyanato substituted vinyl monomer derived from the group consisting of the acrylates, methacrylates, styrene or allyl containing compounds with 2-isocyanatoethyl methacrylate or m-isopropenyl-α,α-dimethylbenzyl isocyanate being preferred isocyanato substituted vinyl monomers.

Preferred are also polymers, wherein (A) is the reaction product of a poly(dimethylsiloxane)-polyamine of structure (A-1), (A-3) or (A-4) with an isocyanato substituted vinyl monomer derived from the group consisting of the acrylates, methacrylates, styrene or allyl group containing compounds, with 2-isocyanatoethyl methacrylate or m-isopropenyl-α,α-dimethylbenzyl isocyanate being the most preferred isocyanato substituted vinyl monomer.

Also preferred are polymers, wherein (A) is the reaction product of a poly(dimethylsiloxane) polyol of structure (A-4) with an isocyanato substituted vinyl monomer derived from the group consisting of the acrylates, methacrylates, styrene or allyl group containing compounds, with 2-isocyanatoethyl methacrylate, m-isopropenyl-α,α-dimethylbenzyl isocyanate, or the reaction product of equimolar amounts of a hydroxy or aminofunctional vinyl compound with an aliphatic or cycloaliphatic diisocyanate being the most preferred isocyanato substituted vinyl monomers.

The poly(dimethylsiloxane) macromers (A) thus contain, attached to the polysiloxane chain through a Si-C bond, multiple acrylate, methacrylate, acrylamido, methacrylamido, vinylether, maleic, itaconic, styryl or allyl groups attached to the polysiloxane chain, and are those obtained by reaction of poly(dimethylsiloxane) polyalkanols, polyamines, polythiols, polyacids or polyepoxides with a vinyl unsaturated acid or the corresponding acid chlorides, maleic or itaconic anhydrides, hydroxy, amino, mercapto or carboxy substituted vinyl compounds, or with an oxirane or isocyanato substituted vinyl monomer derived from the group of acrylate, methacrylate, vinylether, allyl or styrene, as for instance described in U.S. Pat. Nos. 4,136,250; 4,189,546; 4,208,362; 4,276,402; 4,486,577; 4,605,712; 4,837,289.

Typical examples of useful macromers (A) are the reaction products of poly(dimethylsiloxane)-alkanols and amines of the aforementioned structures with acrylic or methacrylic acid or the corresponding acid chlorides, or with a vinyl substituted isocyanate. Poly(-dimethylsiloxane)-alkanols can also be reacted with glycidyl methacrylate and maleic or itaconic anhydrides to form copolymerizable macromers. Also useful are the reaction products of poly(dimethylsiloxane)-acids of the aforementioned structures with glycidyl methacrylate or with hydroxysubstituted acrylates or methacrylates or vinylethers, like 2-hydroxyethyl acrylate, methacrylate or vinylether, or with amino substituted vinyl monomers like N-t-butylaminoethyl methacrylate; the reaction products of poly(dimethylsiloxane)-thiols of the aforementioned structures with glycidyl methacrylate or a vinyl substituted isocyanate and the reaction products of poly(dimethylsiloxane)-epoxides of structures (A-5) and (A-6) with acrylic or methacrylic acid or with hydroxy substituted acrylates or methacrylates or vinyl ethers, like 2-hydroxyethyl acrylate, methacrylate or vinyl ether, or with amino substituted vinyl monomers like N-t-butylaminoethyl methacrylate.

Representative oligosiloxanyl-alkyl acrylates and methacrylates (B) include: tris(trimethylsiloxy-silyl)propyl (meth)acrylate, triphenyldimethyl-disiloxanyl-methyl (meth)acrylate, pentamethyl-disiloxanyl-methyl (meth)acrylate, tert-butyl-tetramethyl-disiloxanylethyl (meth)-acrylate, methyl di(trimethylsiloxy)silyl-propyl-glyceryl (meth)acrylate, pentamethyl-disiloxanyl-methyl methacrylate; heptamethyl-cyclotetrasiloxymethyl methacrylate; heptamethylcyclotetrasiloxypropyl methacrylate; (trimethylsilyl)-decamethyl-pentasiloxy-propyl methacrylate; dodecamethyl pentasiloxypropyl methacrylate. Preferably the monomer is tris-(trimethylsiloxy-silyl)propyl methacrylate.

Fluorine substituted alkyl acrylates and methacrylates (C) include: hexafluoroisopropyl acrylate and methacrylate, perfluorocyclohexyl acrylate and methacrylate, and the acrylate or methacrylate esters or amides of the formula

wherein
$R_f$ is —$(CF_2)_t CF_3$
$R_3$ is hydrogen or methyl,
X is oxygen or —$NR_4$—, wherein $R_4$ is an alkyl group with 1-5 carbon atoms.
r is an integer from 1-4,
t is an integer from 0-7,
W is a direct bond or a group of the structure —$NR_4$—OC—; —$NR_4SO_2$—$(CH_2)_r$—; —$NR_4SO_2$—; —S—$(CH_2)_r$—; —$NR_4$—$(CH_2)_r$—$NR_4SO_2$— or —NHCO—.

Typical examples are 1,1,2,2-tetrahydroperfluorooctyl acrylates and methacrylate, 1,1,dihydroperfluorobutyl acrylate and methacrylate and 1,1,2,2 tetrahydroperfluorobutyl methacrylamide or acrylamide.

Also useful are the fumarates and itaconates of alcohols of structure OH—$(CH_2)_r$—W—$R_f$. Other useful fluorinated monomers include the acrylates and methacrylates of fluoro-alkyl substituted amido-alcohols, such as of $C_7F_{15}CON(C_2H_5)C_2H_7OH$; of sulfonamido-alcohols, such as of $C_8F_{17}C_2H_4SO_2N(CH_3)$—$C_4H_8OH$ and $C_8C_{17}SO_2N(C_2H_5)C_2H_4OH$; of perfluoroether alcohols, such as of $C_3F_7$—$O(C_3F_6O)_2CF(CF_3)$—CH- $_2$OH or (CF$_3$)$_2$CFO(CF$_2$CF$_2$)$_2$—CH$_2$CH$_2$OH; and the acrylates and methacrylate of fluorinated thioether alcohols of structure CF$_3$(CF$_2$)$_x$CH$_2$CH$_2$SCH$_2$CH$_2$CH$_2$OH; acrylates and methacrylates of sulfonamido-amines, such as of R$_f$SO$_2$N(CH$_3$)CH$_2$CH$_2$N(CH$_3$)(CH$_2$)$_3$NH$_2$ and R$_f$CH$_2$SO$_2$NH(CH$_2$)$_2$NH$_2$; of amidoamines, such as of R$_f$CONH(CH$_2$)$_2$NH$_2$; as well as the vinyl monomers obtained by reaction of these aforementioned fluorinated alcohols and amines with 2-isocyanatoethyl acrylate or methacrylate or m-isopropenyl-α,α-dimethylbenzyl isocyanate.

Preferred are hexafluoroisopropyl methacrylate and trifluoroethyl methacrylate, with hexafluoroisopropyl methacrylate being most preferred.

Typical comonomers (D) whose homopolymers have a Shore-D hardness of at least 85, include: methyl methacrylate; cyclohexyl-, trimethylcyclohexyl-, isobornyl-, cyclopentadienyl-, t-butyl-, phenyl- and benzyl methacrylates and acrylates as well as isopropyl methacrylate; styrene and alpha-methyl styrene, and t-butylstyrene. Preferred are methyl, cyclohexyl-, isobornyl and trimethylcyclohexyl methacrylate, with trimethylcyclohexyl methacrylate being most preferred.

Typical poly-vinyl crosslinking comonomers (E) include: the diacrylates and dimethacrylates of 1,2-ethylene glycol, 1,2- and 1,3-propanediol and of 1,3- and 1,4-butane-, 1,5-pentane- and 1,6-hexanediol; the diacrylates and dimethacrylates of diethylene-, triethylene- and tetraethylene glycol, and of neopentylglycol, di-(2-hydroxyethyl) sulfone and thiodiethylene glycol; trimethylolpropane triacrylate and trimethacrylate, di-trimethylolpropane tetraacrylate, pentaerythritol tetraacrylate and tetramethacrylate, dipentaerythritol monohydroxy pentaacrylate; bisphenol-A- and ethoxylated bisphenol-A-dimethacrylate, tris(2-hydroxyethyl)-isocyanurate triacrylate; allyl methacrylate, divinylbenzene and butanediol divinylether; also useful are the reaction products of equivalent amounts of aliphatic, cycloaliphatic and aromatic diisocyanates or of vinyl-unsaturated isocyanates with hydroxy or amino substituted acrylates and methacrylates, for example the reaction products of hexamethylene-1,6-diisocyanate, 3,3,4(4,4,3)-trimethylhexane-1,6-diisocyanate, 4,4'-diisocyanatodiphenylmethane or isophorone diisocyanate with two moles 2-hydroxyethyl- or N-t-butyl-2-aminoethyl acrylate or methacrylate, or 3-hydroxypropyl methacrylamide, or of 1 mol 2-isocyanatoethyl methacrylate with 1 mol hydroxyethyl- or N-t-butyl-2-aminoethyl acrylate or methacrylate, or 3-hydroxypropyl methacrylamide. Also useful are silicone containing diacrylates and dimethacrylates, for example bis(-3-methacryloxypropyl)-tetramethyl disiloxane and bis(-3-methacryloxypropyl)-tetra(trimethylsiloxy) disiloxane, and fluorinated compounds, like 2-(1-thia-2,2,3,3-tetrahydro)-tridecafluorononyl butane-1,4-diol di(meth)acrylate.

Preferred crosslinking comonomers (E) are ethylene glycol di(meth)acrylate, neopentyl glycol di(meth)acrylate and the reaction products of equivalent amounts of 2-hydroxyethyl acrylate and methacrylate or N-t-butyl-3-aminopropyl methacrylate with isophorone diisocyanate or 3,3,4(4,4,3)trimethylhexane-1,6-diisocyanate, or with 2-isocyanatoethyl methacrylate or m-isopropenyl-α,α-dimethylbenzyl isocyanate; also preferred are 1,3-di-(3-methacryloxypropyl)-1,1,3,3-tetramethyl disiloxane and 1,3-di(3-methacryloxypropyl)-1,1,3,3-tetra-(trimethylsiloxy)-disiloxane. Most preferred are the reaction products of equivalent amounts of 2-hydroxyethyl methacrylate or N-t-butyl-3-aminopropyl methacrylate and isophorone diisocyanate.

Typical water soluble, copolymerizable comonomers (F) include: 2-hydroxyethyl, 3-hydroxypropyl, 2,3-dihydroxypropyl, ethoxyethyl, diethoxyethyl, triethoxyethyl acrylate and methacrylate; 3-hydroxypropyl methacrylamide; N-vinylpyrrolidone, vinyl acetamide, N-methyl acrylamide and methacrylamide, N,N-dimethylacrylamide and methacrylamide; N,N-dimethyl-2-aminoethyl methacrylate and N,N-dimethyl-3-aminopropyl methacrylamide; acrylic and methacrylic acid; styrene sulfonic acid and 3-methacrylamido-1-methyl propane sulfonic acid and vinyl phosphonic acid. Also useful comonomers (F) in the context of this invention are the anhydrides of maleic and itaconic acid and glycidyl methacrylate, whose anhydride and oxirane groups can after polymerization easily be hydrolyzed into water solubilizing moieties.

Preferred watersoluble comonomers (F) are methacrylic acid, N,N-dimethylacrylamide an 2-hydroxyethyl methacrylate, with methacrylic acid being most preferred.

SYNTHESIS

The Macromer

The poly-vinylunsaturated poly(dimethylsiloxane) macromers which are esters can be synthesized from the corresponding polyols and polyamines by reaction with acrylic or methacrylic acid or the corresponding acid chlorides or methylesters via conventional esterification or transesterification reactions.

Preferred poly-(dimethylsiloxane) macromers are synthesized from the reactive poly-(siloxanes) by a two-step process, in which the polysiloxane diol or diamine is first reacted with more than the equivalent amount of a aliphatic, aromatic or cycloalophatic diisocyanate, and, secondly, capped by reacting the pending isocyanate groups with an isocyanatereactive vinyl monomer, like an hydroxy or amino functional acrylate or methacrylate. The synthesis of such macromers is described in U.S. Pat. Nos. 4,486,577; 4,734,475, 4,734,405, and 4,923,906.

In a preferred variation of this synthesis, the poly-(dimethylsiloxane) macromers are synthesized from poly(dimethylsiloxane)-diols or diamines of structure (A-1), in which x is 20–50 and y is zero, by reaction with at least four moles of a diisocyanate, like isophorone diisocyanate, followed by reaction of the excess isocyanate groups in a second step with a vinyl-unsaturated isocyanate-reactive compound, like 2-hydroxyethyl methacrylate; simultaneously a diurethane-divinyl monomer, which is a preferred crosslinking agent (E), is formed as a byproduct, acting as a toughening and, unexpectedly, oxygen permeability enhancing component. As a result of using excess diisocyanate in the first synthesis step, the final macromer contains no high molecular weight chain extended molecules with internal urethane or urea groups which would limit compatibility and hardness of the final hard lens polymer.

Alternatively, such macromers with narrow molecular weight distribution and without chain extension can be synthesized by reaction of the polysiloxane diol or diamine with an approximately equivalent amount of a vinyl unsaturated isocyanate; typical isocyanates include 2-isocyanatoethyl methacrylate, 2-isocyanatoethyl acrylate, 3-isocyanatopropyl methacrylate, 1- methyl-2-isocyanatoethyl methacrylate, and 1,1-dimethyl-2-isocyanatoethyl acrylate. Such compounds and their preparation are disclosed, for example, in U.S. Pat. No. 2,718,516 and British Patent No. 1,252,099, and such macromers are described in U.S. Pat. Nos. 4,605,712 and 4,837,298.

Other useful isocyanates include styrene isocyanate and m-isopropenyl-alpha,alpha-dimethylbenzyl isocyanate.

Useful diisocyanates include ethylene diisocyanate, 1,2-diisocyanatopropane, 3-diisocyanatopropane, 1,6-diisocyanatohexane, 1,2-diisocyanatocyclo-hexane, 1,3-diisocyanatocyclohexane, 1,4-diisocyanatobenzene, bis(4-isocyanatocyclohexyl)methane, bis-(4isocyanatocyclohexenyl)methane, bis(4-isocyanato-phenyl)methane, 2,6- and 2,4-toluene diisocyanate; 3,3-dichloro-4,4'-diisocyanatobiphenyl; tris(4-isocyanato-phenyl)methane, 1,5-diisocyanato-naphthalene, hydrogenated toluene diisocyanate; 1-isocyanatomethyl-5-isocyanato-1,3-3-trimethylcyclohexane (= "isophorone diisocyanate"); 1,3,5-tris(6-isocyanatohexyl)biuret, 2,2-4-(2,4,4)-trimethylhexane-1,6-diisocyanate, 2,2'-diisocyanatodiethyl fumarate; 1,5-diisocyanato-1-carboxypentane; 1,2-, 1,3-, 1,6-, 1,7-, 1,8-, 2,7- and 2,3-diisocyanatonaphthalene; 2,4- and 2,7-diisocyanato-1-methylnaphthalene; 4,4'-diisocyanatobiphenyl; 4,4'-diisocyanato-3,3'-diisocyanato-6(7)-methylnaphthalene; 4,4'-diisocyanato-2,2'-dimethyl biphenyl; bis-(4-isocyanatophenyl) ethane and bis(4-isocyanatophenyl ether.

Isocyanate-reactive, active hydrogen containing vinyl compounds useful for carrying out the second step of the macromer synthesis are, for example, 2- and 3-hydroxypropyl acrylate and methacrylate; 4-hydroxybutyl acrylate and methacrylate; glycerol dimethacrylate; hydroxyethyl maleate and fumarate; 2-hydroxyethyl- and 4-hydroxy-butyl vinyl ether; N-(3-hydroxypropyl)-methacrylamide; vinyl-benzyl alcohol and allyl alcohol.

The reaction is carried out either in bulk or in solution at room temperature or slightly elevated temperatures; for urethane linkage formation a catalyst is preferably used, like triethylamine or dibutyltin-dilaurate and the like.

The synthesis of poly(siloxane)-polyvinyl macromers with a molecular weight distribution essentially the same as that of the hydroxy- or amino functional poly(-dimethylsiloxane) reactant, as measured by the dispersity D (D=$MW_w/MW_n$), by reaction of said hydroxy- or amino functional poly(dimethylsiloxane) reactant with an at least 4-fold molar amount of a diisocyanate, followed by reaction with an isocyanate-reactive vinyl monomer, for example an hydroxy- or amino-functional vinyl monomer, is thus another embodiment of this invention.

Preferably the diisocyanate is an aliphatic or cycloaliphatic diisocyanate, most preferably isophorone diisocyanate; the isocyanate-reactive vinyl monomer is preferably 2-hydroxyethyl methacrylate, N-t-butyl-3-aminoethyl methacrylate or allyl alcohol, most preferably 2-hydroxyethyl methacrylate or N-t-butyl-3-aminoethyl methacrylate.

THE POLYMER

The final polymer is synthesized by mixing the appropriate amounts of macromer and comonomers, addition of a free-radical generating initiator and exposing the deoxygenated mixture in a mold to either UV or heat until polymerization is complete. The mold can consist of plastic cups for making button blanks, or of circular rods or flat sheets from which buttons can be cut for final machining into a contact lens. Alternatively the lenses can be also molded in lens casting molds, in which either both or only one surface is optically true.

Typical thermally activated initiators are organic peroxides and hydroperoxides, and azo-compounds. Representative examples of such initiators include benzoyl peroxide, tertiary-butyl perbenzoate, diisopropyl peroxydicarbonate, cumene hydroperoxide, azobis-(isobutyronitrile), and the like. Generally, from about 0.01 to 5 percent by weight of thermal initiator is used.

It is important that thermal polymerization is carried out at a very slow rate, that is low temperature, over a long period of time, usually more than 24 hours, in order to avoid excessive exotherming of the reaction and the accompanying formation of optical defects, like schlieren and other distortions.

UV-initiated polymerization is carried out using photoinitiators. Such initiators are well known and have been described, for example, in polymerization art, e.g., Chapter II of "Photochemistry" by Calvert and Pitts, John Wiley & Sons (1966). The preferred initiators are photoinitiators which facilitate polymerization when the composition is irradiated. Representative examples of such initiators include acyloin and derivatives thereof, such as benzoin, benzoin methyl ether, benzoin ethyl ether, benzoin isopropyl ether, benzoin isobutyl ether and a-methylbenzoin; diketones such as benzil and diacetyl, etc.; ketones such as acetophenone, a,a,a-tribromoacetophenone, a,a-diethoxyacetophenone (DEAP), 2-hydroxy 2-methyl-1-phenyl-1-propanone, o-nitro-a,a,a-tribromoacetophenone, benzophenone and p,p'-tetramethyldiamino-benzophenone; a-acyloxime esters such as benzil-(0-ethoxycarbonyl)-a-monoxime; ketone/amine combinations such as benzophenone/N-methyldiethanolamine, benzophenone/tributylamine and benzophenone/Michler's ketone; and benzil ketals such as benzil dimethyl ketal, benzil diethyl ketal and 2,5-dichlorobenzil dimethyl ketal. Normally the photoinitiator is used in amounts ranging from about 0.01 to 5% by weight of the total monomeric composition.

Preferably, about 0.1 to 1.0% of photoinitiator is used in the polymerizable compositions.

UV initiated polymerization is also preferably carried out using an initial phase of low intensity UV—$1\times 10^{-2}\mu W/cm^2$—for several hours or until the mixture has gelled, before completing the cure at high intensity—$12\times 10^{-2}\mu W/cm^2$. It is also possible to combine an initial, slow thermal cure cycle with a following high intensity UV cure.

After polymerization is complete, the polymers are annealed and post-cured by heating them in a vacuum oven for one hour to 100° C. and allowing them to slowly cool down to room temperature.

The complete polymer synthesis is more clearly described in the following examples.

In those examples, number average molecular weights, $MW_n$, have been determined by endgroup titration and molecular weight dispersities, D=$MW_w/MW_n$, by gel permeation chromatography.

Oxygen permeability is measured at 25° C. and 0.25 mm sample thickness, with a $O_3$-Permeometer-Model 201-T (Createch), using buffered saline (pH=7) as electrolyte and is expressed in units:

$$O_2 \cdot DK(\text{barrers}) = \frac{cm^3(STP)cm}{cm^2 \sec cm\ HG} 10^{-10}.$$

Physical-mechanical measurements are carried out with an INSTRON testing apparatus, model 1123 on 0.6–1 mm thick sheets. Hardness measurements are carried out with a Shore-D hardness meter.

Silicone analysis was done by atomic absorption, fluorine analysis by the combustion method.

The following examples are presented for the purpose of illustration only and are not to be construed to limit the nature and scope of the instant invention in any manner whatsoever.

Examples 1–11 describe the synthesis of poly(dimethylsiloxane) [PDMS] urethane- and urea vinyl macromers.

EXAMPLE 1

Preparation of poly-siloxane bis-urethane methacrylate macromer:

A 300 mL 3-necked flask fitted with a mechanical stirrer, thermometer, condenser and nitrogen inlet is charged with 112.18 g (0.0414 moles) poly(dimethylsiloxane)-diol (structure A-1: y=0, $R_1$=propyl, $MW$=2706; Shinetsu A-1000), which had been stripped free of volatiles by passing it through a wiped-film evaporator.

19.5 g (0.0877 moles) 1-isocyanatomethyl-5-isocyanato-1,3,3-trimethylcyclohexane (isophorone diisocyanate, IPDI) are added together with 0.14 g dibutyltin dilaurate as catalyst. The mixture is then stirred under nitrogen on a temperature controlled water bath at 50° C. for five hours. After that time the NCO content as determined by titration has fallen to approximately ¼ of the original value, indicating the formation of the isocyanate capped prepolymer.

To 126.5 g of that polydimethylsiloxane diisocyanate prepolymer prepared above are added 12.17 g (0.0935 moles) 2-hydroxyethyl methacrylate (HEMA) and the mixture is stirred under nitrogen at room temperature until all NCO groups have been reacted as determined by the absence of the isocyanate band from the infrared spectrum. The resulting product, as analyzed by gel permeation chromatography, consists of methacrylate terminated polysiloxane with a dispersity of 1.7 and a minor amount of HEMA-capped IPDI indicating that some chain extension had taken place.

EXAMPLE 2

Synthesis of macromers with excess diisocyanate and reduced dispersity:

9.96 g (0.0037 moles) stripped PDMS-diol of Example 1 ($MW_2$=2706), and 12.5 g of hexafluoroisopropyl methacrylate ($F_6MA$) are placed into a 100 mL 3-necked round bottomed flask. The flask is fitted with a mechanical stirrer, thermometer and gas inlet adaptor and is kept under dry air.

7.39 g (0.0332 moles) isophorone-diisocyanate (IPDI) are added and stirred, forming a clear solution; 0.0350 g (2 drops) of dibutyltin dilaurate (DBTL) are added and the mixture is stirred for 5¼ hours; the solution turns clear.

The solution is kept under dry air and is cooled by an ice-water bath to 15° C. 8.08 g (0.0621 moles) of distilled 2-hydroxyethyl methacrylate (HEMA) are added while stirring. After 15 min the ice-water bath is removed; the mixture turns cloudy due to formation of some IPDI-HEMA diadduct; it is stirred at room temperature, overnight, under dry air.

The milky white liquid is stored in a brown bottle in the refrigerator. It consists of 33% macromer with dispersity D of 1.4, 33% IPDI-di HEMA [IP(HE)] and 33% $F_6MA$.

Synthesis of PDMS-urea/urethane-dimethacrylate macromer.

EXAMPLE 3

23.8 g (0.107 moles) isophorone-diisocyanate and 40.14 g hexafluoroisopropyl methacrylate ($F_6MA$) are placed into a 100 mL 3-necked round bottomed flask. The flask is fitted with a mechanical stirrer, thermometer and gas inlet adaptor and is kept under dry air and cooled by an ice-water bath.

31.52 g (0.012 moles) poly(dimethylsiloxane)-diamine (structure A-1; y=0, $R_1$=propyl, MW=2628, from Goldschmidt G.m.b.H.) are added slowly to the stirred and cooled solution, forming a clear, viscous mixture, which is stirred for another 3¼ hours.

The solution is kept under dry air and is cooled by an ice-water bath to 15° C. 25.9 g (0.199 moles) of distilled 2-hydroxyethyl methacrylate (HEMA) are added while stirring. After 15 min the ice-water bath is removed; the mixture turns cloudy due to formation of some IPDI-HEMA diadduct; it is stirred at room temperature, overnight, under dry air.

EXAMPLES 4–6

Following the procedures of Examples 2 and 3 respectively, PDMS-macromers are prepared from PDMS-diols and PDMS-diamines and using varying amounts of excess isophorone diisocyanate; these macromers and the macromers of the previous examples are listed, together with their molecular weight dispersities and the percentage of IPDI-diHEMA adduct formed, in the following table:

| Ex. Nr. | PDMS Reactant Structure | | | Mol Ratio PDMS/ IPDI | D | IP(HE)$_2$ (%) |
|---|---|---|---|---|---|---|
| | $R_1$ | X | MW | | | |
| 1 | A-1; s-propyl | —O— | 2708 | 1:2 | 1.7 | 0 |
| 4 | A-1; s-propyl | —O— | 2708 | 1:7 | 1.5 | 27 |
| 2 | A-1; s-propyl | —O— | 2708 | 1:9 | 1.4 | 33 |
| 5 | A-1; n-propyl | —O— | 2233 | 1:5.5 | 1.5 | 24 |
| 6 | A-1; n-hexyl | —O— | 2332 | 1:8.3 | 1.6 | 33 |
| 3 | A-1; n-propyl | —NH— | 2628 | 1:8.9 | 1.8 | 33 |

The molecular weight distributions, as measured by D, are narrower for macromers made with a large excess of IPDI (Ex. 1,2,4); D for examples 3, 5 and 6 are close to the theoretical values calculated for non-chain extended macromers, which are 1.7 for Ex.3, 1.5 for Ex.5 and 1.6 for Ex.6.

EXAMPLES 7a

The procedure of Example 2 is repeated, but instead of isophorone diisocyanate, 3,3,4(4,4,3)-trimethylhexane-1,6-diisocyanate is used in equivalent amounts, and instead of 2-hydroxyethyl methacrylate, N-t-butylaminoethyl methacrylate is used in the final isocyanate capping step. A clear, viscous PDMS-macromer solution is obtained.

EXAMPLES 7b

The procedure of Example 2 is repeated, but instead of 2-hydroxyethyl methacrylate, allyl alcohol is used in the final isocyanate capping step. A clear, viscous PDMS-macromer solution is obtained.

EXAMPLE 8

Synthesis of tetra-(urethane-styryl) terminated poly(-dimethylsiloxane).

20.02 g (0.021 hydroxy eqv.) of a poly(siloxane)-dialkyltetrol of structure A-2 with $x_1$ approximately 48 (MW 3805), are mixed in a 100 cc reaction flask with 3.25 g (0.021 eqv.) of 2-isocyanatoethyl methacrylate (IEM; from DOW Chem. Corp.) and 0.053 g DBTL. The mixture is stirred under dry air 24° C. until all NCO has disappeared, as determined by IR. The clear, viscous reaction product, consisting of a polysiloxane terminated at both ends with urethane connected ethyl methacrylate groups is stored in the dark under nitrogen.

EXAMPLE 9

Synthesis of PDMS-di vinyl macromers from PDMS-diols and diamines and 2-isocyanatoethyl methacrylate.

21.19 g (0.005 moles) of poly-(dimethylsiloxane)-dialkanol (A-1; $R_1$=propyl, MW=2438; Shin-Etsu X-61-504A) are reacted with 1.552 g (0.01 moles) of 2-isocyanatoethyl methacrylate at 25° C. for 6 hours using 0.01 g dibutyltin dilaurate as catalyst. A clear viscous resin is obtained with a theoretical MW of 2749.

EXAMPLE 10

56.62 g (32.1 m mole) of an α,w-di-propylamino-poly-(dimethyl siloxane) (A-1; $R_1$=propyl, y=0, MW=1770; Shin Etsu Corp. No. X-22-161A) are placed in a 100 mL 3-neck round bottom flask fitted with a mechanical stirrer, gas inlet tube and thermometer. The diamine is cooled with an ice-water bath and kept under a dry air atmosphere. 9.97 g (64.3 m moles) 2-isocyanatoethyl methacrylate (IEM) are added and the mixture is stirred. After 30 min. the ice-water bath is removed and the contents are stirred for an additional 4 hours. IR-analysis of the clear, light-yellow viscous liquid shows no NCO peak present at 2350 cm$^{-1}$.

EXAMPLE 11

Synthesis of urea-styryl terminated PDMS-macromer and an urea crosslinker.

6.6 g (2.45 m moles) of the aminopropyl-capped PDMS of Example 10 and 7.61 g hexafluoroisopropyl methacrylate are placed in a 100 mL 3-neck round bottom flask fitted with a mechanical stirrer, gas inlet tube and thermometer. The diamine is cooled with an ice-water bath and kept under a dry air atmosphere. 4.98 g (24.76 m moles) of m-isopropenyl-α,α-dimethylbenzyl isocyanate (TMI) are added while stirring. After 15 minutes the ice-water bath is removed and the contents are stirred for an additional hour.

The contents are cooled with an ice-water bath and 3.64 g (19.66 m moles) N-t-butylaminoethyl methacrylate are slowly added. After one hour the ice bath is removed and the mixture is stirred for an additional three hours to yield a solution consisting of 33.3% α-methylstyrene capped poly(dimethylsiloxane), 33.3% N-(m-isopropenyl-1,1-dimethylbenzyl)-N'-t-butyl-N'-methacryloxyethyl urea and 33.3% hexafluoroisopropyl methacrylate.

Preparation of Polymer Samples

EXAMPLE 12

30 g of the polysiloxane macromer prepared according to Example 1 are mixed with 17.5 g hexafluoroisopropyl methacrylate, 9.4 g ethyleneglycol dimethacrylate and 5.6 g methacrylic acid; 0.06 g DARACURE 1173 (UNIROYAL Corp.) are added and the mixture is thoroughly degassed and then stored under nitrogen. One portion of the mixture is used to prepare a 1.0 mm thick sheet between MYLAR lined glass plates, using silicone cord as a spacer and held together by clamps. The mold is exposed to UV light from a Black Light Blue (SYLVANIA) lamp for 3 hours, after which time the polymer is removed from the mold to be used for testing.

Another part of the monomer-macromer mixture is filled with a fixed-volume syringe into cylindrical polypropylene molds of 14 mm diameter and 8 mm height and sealed by a loose fitting, convex-polypropylene cover. The molds are inserted in a tray and irradiated in a nitrogen sparged box, using the lamps described above, first from below only at an intensity of $1\times10^{-2}\mu W/cm^2$ for 8 hours, then from the top and below for three additional hours at an intensity of $12\times10^{-2}\mu W/cm^2$.

The molds are opened and the polymer buttons removed, annealed at 100° C. for one hour and allowed to cool to room temperature. Several buttons are cut in half, both parallel and normal to the round surface and the cut surfaces are polished to measure hardness. From another button a 0.2 mm thick slice is cut for oxygen permeability measurements.

EXAMPLES 13-16

Following the procedure of Example 12, polymers with various compositions are prepared in sheet and button form. Their compositions and properties are shown, together with those of Example 12 and Fluoroperm-92, a commercial RGP lens material, in the following tables.

Table of Example 12-16 compositions.

| | Composition, % by weight | | | | | | | |
|---|---|---|---|---|---|---|---|---|
| Example | Si-Mac | TMMA | Si-M | F6MA | F3MA | EDMA | Si6X | MAA |
| 12 | 48 | — | — | 28 | — | 15 | — | 9 |
| 13 | 36 | 1.5 | 11 | 21 | 7.5 | 11 | 3 | 9 |
| 14 | 24 | 3.0 | 22 | 14 | 15 | 8 | 5 | 9 |
| 15 | 12 | 4.5 | 34 | 7 | 22 | 4 | 8 | 9 |
| 16 | — | 6.0 | 45 | — | 30 | — | 10 | 9 |

In these Examples Si-Mac is the pDMS-urethane-dimethacrylate macromer of example 1;
TMMA is trimethylcyclohexyl methacrylate,
Si-M is tris(trimethylsiloxy)silylpropyl methacrylate,
F6MA is hexafluoroisopropyl methacrylate, $F_3MA$ is trifluoroethyl methacrylate,
EDMA is ethyleneglycl dimethacrylate,
$Si_6X$ is 3,5-bis(3-methacroyloxypropyl)-3,5-bis(trimethylsiloxy)-1,1,1,7,7,7-hexamethyltetrasiloxane,
and
MAA is methacrylic acid.

The polymers are tested as described and their properties are reported in the following table:

Table of Examples 12-16 polymer properties.

| Ex. Nr. | Sh-D | T. ST. kg/mm² | Y. Mod. kg/mm² | El. % | O₂DK | B | Si % | F % |
|---|---|---|---|---|---|---|---|---|
| 12 | 69 | 1.8 | 44 | 12 | 89 | n | 14 | 14 |
| 13 | 71 | 1.8 | 49 | 9 | 78 | n | 14 | 13 |
| 14 | 75 | 2.9 | 53 | 8 | 73 | n | 14 | 12 |
| 15 | 77 | 2.3 | 56 | 7 | 69 | n | 15 | 11 |
| 16 | 78 | 0.6 | 58 | 1.6 | 64 | vb | 15 | 10 |
| JPX | 68 | | | | 73 | n | 11 | 15 |
| FP-92 | 80 | | | | 44 | n | 15 | 6 |

JPX is a commercial RGP polymer from Japan; FP-92 is Fluoroperm-92, a commercial RGP contact lens material from PARAGON OPTICAL Corp.

B = brittleness: n = not brittle, 0.2 mm polymer disk can be bent at least 45 without breaking; vb = very brittle, polymer disk breaks.

As can be seen by the very low elongation, the polymer without any macromer is extremely brittle: a 0.2 mm thick disc could not be bent to any degree (B=vb, for very brittle), whereas the other polymers could be measurably bent without breaking.

EXAMPLES 17-22

Using the procedure of Example 12, the following polymers are synthesized with the macromer of Example 1:

Table of Examples 17-22 compositions.

| Example Nr. | Mac. | TMMA | Si-M | F₆MA | EDMA | Si₆X | MAA |
|---|---|---|---|---|---|---|---|
| 17 | 5 | 6 | 30 | 35 | — | 15 | 9 |
| 18 | 7 | 5 | 34 | 35 | — | 10 | 9 |
| 19 | 12 | 5 | 34 | 29 | 3 | 8 | 9 |
| 20 | 12 | 11 | 34 | 29 | 5 | — | 9 |
| 21 | 12 | 4 | 35 | 35 | 5 | — | 9 |
| 22 | 15 | — | 34 | 29 | 13 | — | 9 |

The polymers are tested as described and their properties are reported in the following table:

Table of Examples 17-22 polymer properties.

| Example Nr. | Sh-D | T. Str. kg/mm² | Y. Mod. kg/mm² | El. % | O₂DK | Si % | F % |
|---|---|---|---|---|---|---|---|
| 17 | 76 | 1.4 | 68 | 6 | 77 | 13 | 17 |
| 18 | 75 | 2.0 | 66 | 5 | 79 | 14 | 17 |
| 19 | 75 | 2.0 | 62 | 7 | 80 | 14 | 14 |
| 20 | 77 | 1.6 | 66 | 5 | 70 | 12 | 14 |
| 21 | 75 | 3.2 | 63 | 7 | 74 | 13 | 17 |
| 22 | 76 | 1.4 | 65 | 6 | 79 | 13 | 14 |
| JPX | 68 | | | | 73 | 11 | 15 |
| FP-92 | 80 | | | | 44 | 15 | 6 |

All polymers are non brittle, despite their high silicone and fluorine content, as can be judged by their elongation, ad all can be bent without breaking.

EXAMPLE 23-32

Following the procedure of Example 12, the polymers with the composition and properties listed in the following tables are synthesized, using the macromers as identified by their example number:

Table of Examples 23-32 compositions.
All polymers contain 9% methacrylic acid as comonomer.

| Ex. Nr. | Mac. Ex. Nr. | D | Mac | TMMA | SiMA | F₆MA | IP/HE | EDMA | Si₆X |
|---|---|---|---|---|---|---|---|---|---|
| 23 | 2 | 1.4 | 7 | 5 | 34 | 35 | 7 | — | 3 |
| 24 | 4 | 1.5 | 12 | 5 | 36 | 30 | 8 | — | — |
| 25 | 1 | 1.7 | 15 | — | 34 | 29 | — | 13 | — |
| 26 | 3 | 1.8 | 7 | 8 | 34 | 35 | 7 | — | — |
| 27 | 2 | 1.4 | 7 | 5 | 34 | 35 | 7 | 3 | — |
| 28 | 6 | 1.6 | 7 | 8 | 34 | 35 | 7 | — | — |
| 29 | 2 | 1.4 | 12 | 5 | 33 | 29 | 12 | — | — |
| 30 | 2 | 1.4 | 15 | — | 31 | 30 | 15 | — | — |
| 31 | 5 | | 7 | 8 | 36 | 35 | 4 | — | 1 |
| 32 | 3 | 1.8 | 7 | 5 | 40 | 35 | 4 | — | — |

Table of Examples 23-32 polymer properties.

| Ex. Nr. | Mac. Ex. Nr. | D | Mol Ratio PDMS/IPDI | Shore-D Hardness | O2-DK |
|---|---|---|---|---|---|
| 23 | 2 | 1.4 | 1/9 | 79 | 74 |
| 24 | 4 | 1.5 | 1/7 | 77 | 79 |
| 25 | 1 | 1.7 | 1/2 | 76 | 79 |
| 26 | 3 | 1.8 | 1/8.9 | 79 | 75 |
| 27 | 2 | 1.4 | 1/8 | 80 | 66 |
| 28 | 6 | 1.6 | 1/8.3 | 79 | 73 |
| 29 | 2 | 1.4 | 1/9 | 79 | 63 |
| 30 | 2 | 1.4 | 1/9 | 75 | 75 |
| 31 | 5 | 1.5 | 1/5.5 | 78 | 79 |
| 32 | 3 | 1.8 | 1/8.9 | 77 | 102 |
| JPX | | | | 68 | 73 |
| FP-92 | | | | 80 | 45 |

D is polymer molecular weight dispersity, $MW_w/MW_n$. JPX is an experimental RGP polymer from Japan; FP-92 is a commercial RGP lens material marketed by PARAGON OPTICAL Corp.

EXAMPLE 33

Example 31 is repeated, but using instead of trimethylcyclohexyl methacrylate, the same amount of methyl methacrylate. A clear polymer is obtained with a Shore-D hardness of 78 and an oxygen permeability DK of 73.

EXAMPLE 34

Example 31 is repeated, but using instead of trimethylcyclohexyl methacrylate, the same amount of isobornyl methacrylate. A clear polymer is obtained with a Shore-D hardness of 79 and an oxygen permeability DK of 75.

EXAMPLE 35

Example 31 is repeated, but using instead of trimethylcyclohexyl methacrylate, the same amount of t-butylstyrene. A clear polymer is obtained with a Shore-D hardness of 75 and an oxygen permeability DK of 76.

EXAMPLE 36

Example 31 is repeated, but using instead of trimethylcyclohexyl methacrylate, the same amount of cyclohexyl methacrylate. A clear polymer is obtained with a Shore-D hardness of 78 and an oxygen permeability DK of 73.

EXAMPLE 37

Example 21 is repeated, using the allyl-terminated macromer of Example 7b. A clear polymer is obtained with a Shore-D hardness of 75 and an oxygen permeability DK of 74.

EXAMPLE 38

Example 21 is repeated, using the tetra-methacrylate terminated macromer of Example 8. A clear polymer is obtained with a Shore-D hardness of 77 and an oxygen permeability DK of 73.

EXAMPLE 39

Example 26 is repeated, using the urea-styryl macromer and styryl-methacrylate crosslinking comonomer of Example 11. A clear polymer is obtained with a Shore-D hardness of 79 and an oxygen permeability DK of 80.

EXAMPLE 40

Example 21 is repeated, using as macromer the $\alpha,\omega$-dimethacrylate obtained by reaction of a $\alpha,\omega$-dioxiranepoly(dimethylsiloxane) of structure A-5 with acrylic acid (TEGOMER V-Si 2150; $MW_n=1100$; Goldschmidt AG). A clear polymer is obtained with a Shore-D hardness of 79 and an oxygen permeability DK of 78.

EXAMPLE 41

24 g (10 mmole) of an $\alpha,\omega$-di-oxirane-poly-(dimethyl siloxane) (structure A-5: $z=1$, $R_1=$propyl, $y=0$, $MW=2400$; TH. Goldschmid AG, TEGOMER E-Si 2330) are placed in a 100 mL 3-neck round bottom flask fitted with a mechanical stirrer, gas inlet tube and thermometer. The dioxirane is stirred at 40° C. under a dry air atmosphere while 3.1 g (20.6 mmoles) N-t-butyl-2-aminoethyl methacrylate are slowly added. The mixture is stirred for an 24 hours. A clear methacrylate functional poly-(dimethyl siloxane) macromer is obtained.

10 g of this macromer are used to make up a UV-polymerizable comonomer composition as described in Example 21; after polymerization a clear, hard polymer is obtained with a Shore-D hardness of 76 and an oxygen permeability DK of 85.

What we claim is:

1. A process for making a poly(siloxane)-polyvinyl macromer with a molecular weight dispersity D identical or lower than that of the hydroxy or amino functional poly(siloxane), which consists of reacting an hydroxy- or amino functional poly(dimethylsiloxane) with an aliphatic or cycloaliphatic diisocyanate in a molar ratio of 1 mol functional poly(dimethylsiloxane) to at least 4 moles of the diisocyanate, followed by reaction of the remaining isocyanate groups with equivalent amounts of an active hydrogen containing vinyl monomer.

2. A process for making a poly(siloxane)-polyvinyl macromer with a molecular weight dispersity D identical or lower than that of the hydroxy or amino functional poly(siloxane), which consists of creating an hydroxy- or amino functional poly(dimethylsiloxane) of structure A-1, wherein y is zero, with an aliphatic or cycloaliphatic diisocyanate in a molar ratio of 1 mol functional poly(dimethylsiloxane) to at least 4 moles of the diisocyanate, followed by reaction of the remaining isocyanate groups with equivalent amounts of an isocyanate-reactive vinyl monomer.

3. A process according to claim 2 for making a poly(dimethylsiloxane)-polyvinyl macromer with a molecular weight dispersity D identical or lower than that of the hydroxy or amino functional poly(dimethylsiloxane), wherein the diisocyanate is isophorone diisocyanate or 3,3,4(4,4,3)trimethylhexane-1,6-diisocyanate and the isocyanate-reactive vinyl monomer is 2-hydroxyethyl (meth)acrylate or N-t-butyl-2-aminoethyl methacrylate.

* * * * *